(12) United States Patent
Amanullah

(10) Patent No.: US 10,988,658 B2
(45) Date of Patent: Apr. 27, 2021

(54) DATE TREE WASTE-BASED TRINARY FIBROUS MIX FOR MODERATE TO SEVERE LOSS CONTROL

(71) Applicant: Saudi Arabian Oil Company, Dhahran (SA)

(72) Inventor: Md Amanullah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/548,026

(22) Filed: Aug. 22, 2019

(65) Prior Publication Data

US 2019/0375973 A1 Dec. 12, 2019

Related U.S. Application Data

(62) Division of application No. 15/689,074, filed on Aug. 29, 2017, now Pat. No. 10,494,558.

(Continued)

(51) Int. Cl.
    *C09K 8/035* (2006.01)
    *C09K 8/506* (2006.01)
    (Continued)

(52) U.S. Cl.
    CPC .............. *C09K 8/035* (2013.01); *C09K 8/506* (2013.01); *C09K 8/514* (2013.01); *C09K 8/516* (2013.01);
    (Continued)

(58) Field of Classification Search
    None
    See application file for complete search history.

(56) References Cited

U.S. PATENT DOCUMENTS 2,483,936 A 10/1949 Roberts
2,600,404 A 6/1952 Hoeppel
(Continued)

FOREIGN PATENT DOCUMENTS

CN 101311243 A 11/2008
CN 101724383 A 6/2010
(Continued)

OTHER PUBLICATIONS

Wajheeuddin, Mohammed; "Development of an Environmentally-Friendly Drilling Fluid Using Date Seeds and Grass" Master's thesis, King Fahd University of Petroleum & Minerals, 2014; pp. 1-138.

(Continued)

*Primary Examiner* — Jeffrey D Washville
(74) *Attorney, Agent, or Firm* — Bracewell LLP; Constance G. Rhebergen; Brian H. Tompkins

(57) ABSTRACT

A date tree fiber mix lost circulation material (LCM) is provided that includes a trinary mix of fibers produced from date trees. The date tree fiber mix LCM may include date tree trunk fibers produced from date tree trunks, date tree leaf and leaf stem fibers produced from date tree leaves and leaf stems, and date tree panicle fibers produced from date tree panicles. The LCM include a mix of 30% by weight date tree trunk fibers, 30% date tree leaf and leaf stem fibers, and 40% by weight date tree panicle fibers. Methods of lost circulation control using and manufacture of a date tree fiber mix LCM are also provided.

4 Claims, 4 Drawing Sheets

Related U.S. Application Data

(60) Provisional application No. 62/436,211, filed on Dec. 19, 2016.

(51) Int. Cl.

| | |
|---|---|
| *C09K 8/514* | (2006.01) |
| *E21B 33/138* | (2006.01) |
| *E21B 21/00* | (2006.01) |
| *C09K 8/516* | (2006.01) |

(52) U.S. Cl.
CPC .......... *E21B 21/003* (2013.01); *E21B 33/138* (2013.01); *C09K 2208/04* (2013.01); *C09K 2208/08* (2013.01)

(56) References Cited

U.S. PATENT DOCUMENTS

| | | | |
|---|---|---|---|
| 2,749,308 A | 6/1956 | Beckum et al. | |
| 2,779,417 A | 1/1957 | Clark, Jr. et al. | |
| 2,789,948 A | 4/1957 | Tronolone | |
| 2,811,488 A | 10/1957 | Nestle et al. | |
| 2,912,380 A | 11/1959 | Groves | |
| 2,943,679 A | 7/1960 | Scott, Jr. | |
| 2,943,680 A | 7/1960 | Scott et al. | |
| 3,217,801 A | 11/1965 | Fast et al. | |
| 4,110,225 A | 8/1978 | Cagle | |
| 4,247,403 A | 1/1981 | Foley et al. | |
| 4,275,788 A | 6/1981 | Sweatman | |
| 4,428,844 A | 1/1984 | Wagener | |
| 4,474,665 A | 10/1984 | Green | |
| 4,579,668 A | 4/1986 | Messenger | |
| 4,619,772 A | 10/1986 | Black et al. | |
| 5,004,553 A * | 4/1991 | House | C09K 8/035 507/100 |
| 5,118,664 A | 6/1992 | Burts, Jr. | |
| 5,197,324 A | 3/1993 | Keys | |
| 5,332,724 A | 7/1994 | Burts, Jr. | |
| 5,484,028 A | 1/1996 | Rose | |
| 5,501,275 A | 3/1996 | Card et al. | |
| 5,801,127 A | 9/1998 | Duhon, Sr. | |
| 6,016,879 A | 1/2000 | Burts, Jr. | |
| 6,098,712 A | 8/2000 | Burts, Jr. | |
| 6,102,121 A | 8/2000 | Burts, Jr. | |
| 6,271,001 B1 | 8/2001 | Clarke et al. | |
| 6,350,594 B1 | 2/2002 | Clarke et al. | |
| 6,518,224 B2 | 2/2003 | Wood | |
| 6,716,798 B1 | 4/2004 | Burts, Jr. | |
| 6,750,179 B1 | 6/2004 | Burts, Jr. | |
| 6,790,812 B2 | 9/2004 | Halliday | |
| 6,806,232 B1 | 10/2004 | Cart | |
| 6,861,392 B2 | 3/2005 | Shaarpour | |
| 6,932,158 B2 | 8/2005 | Burts | |
| 7,226,895 B2 | 6/2007 | Xiang | |
| 7,271,131 B2 | 9/2007 | Halliday et al. | |
| 7,284,611 B2 | 10/2007 | Reddy et al. | |
| 7,297,662 B2 | 11/2007 | Verret | |
| 7,297,663 B1 | 11/2007 | Kilchrist et al. | |
| 7,488,705 B2 | 2/2009 | Reddy et al. | |
| 7,507,692 B2 | 3/2009 | Xiang | |
| 7,537,054 B2 | 5/2009 | Reddy et al. | |
| 7,541,317 B2 | 6/2009 | Pomerleau | |
| 7,629,297 B2 | 12/2009 | Shaarpour | |
| 7,795,184 B2 | 9/2010 | Pomerleau | |
| 7,902,126 B1 | 3/2011 | Burts, Jr. | |
| 7,923,413 B2 | 4/2011 | Ghassemzadeh | |
| 7,964,537 B2 | 6/2011 | Rayborn, Sr. et al. | |
| 8,371,381 B2 | 2/2013 | Shindgikar et al. | |
| 8,383,558 B2 | 2/2013 | Reddy et al. | |
| 8,404,622 B2 | 3/2013 | Ghassemzadeh | |
| 8,673,825 B2 | 3/2014 | Rayborn, Sr. et al. | |
| 8,739,872 B1 | 6/2014 | Miller et al. | |
| 8,776,882 B2 | 7/2014 | Shindgikar et al. | |
| 8,887,808 B2 | 11/2014 | Kumar et al. | |
| 8,935,957 B2 | 1/2015 | Kulkarni et al. | |
| 8,992,670 B1 | 3/2015 | Vohra | |
| 9,140,118 B2 | 9/2015 | Kulkarni et al. | |
| 9,175,529 B2 | 11/2015 | Jamison et al. | |
| 9,410,066 B2 | 8/2016 | Ghassemzadeh | |
| 9,416,306 B2 | 8/2016 | Savari et al. | |
| 9,453,156 B2 | 9/2016 | Wu | |
| 9,592,488 B2 | 3/2017 | Yusuf et al. | |
| 9,623,067 B1 | 4/2017 | Awad et al. | |
| 9,688,901 B2 | 6/2017 | Fontenot | |
| 9,783,727 B2 | 10/2017 | Lahman et al. | |
| 9,957,433 B2 | 5/2018 | Amanullah et al. | |
| 10,336,930 B2 | 7/2019 | Amanullah | |
| 10,414,965 B2 | 9/2019 | Amanullah | |
| 10,479,920 B2 | 11/2019 | Amanullah et al. | |
| 10,513,647 B2 | 12/2019 | Amanullah | |
| 10,519,357 B2 | 12/2019 | Amanullah | |
| 10,597,575 B2 | 3/2020 | Amanullah et al. | |
| 2002/0010100 A1 | 1/2002 | Wood | |
| 2004/0023813 A1* | 2/2004 | Burts, III | C09K 8/512 507/200 |
| 2004/0129460 A1 | 7/2004 | MacQuoid et al. | |
| 2004/0244978 A1 | 12/2004 | Shaarpour | |
| 2005/0113260 A1 | 5/2005 | Wood | |
| 2005/0124502 A1 | 6/2005 | Shaarpour | |
| 2005/0217852 A1 | 10/2005 | Bennett et al. | |
| 2006/0106136 A1 | 5/2006 | Abu-Sharkh | |
| 2006/0122069 A1 | 6/2006 | Burts, III | |
| 2006/0157247 A1 | 7/2006 | Burts, III | |
| 2006/0160907 A1 | 7/2006 | Stamp | |
| 2009/0054269 A1 | 2/2009 | Chatterji et al. | |
| 2009/0286697 A1 | 11/2009 | Shaarpour | |
| 2009/0305911 A1 | 12/2009 | Pomerleau | |
| 2010/0152070 A1 | 6/2010 | Ghassemzadeh | |
| 2010/0181110 A1 | 7/2010 | Harr | |
| 2010/0193244 A1 | 8/2010 | Hoskins | |
| 2010/0230164 A1 | 9/2010 | Pomerleau | |
| 2010/0230169 A1 | 9/2010 | Pomerleau | |
| 2011/0214870 A1 | 9/2011 | Shaarpour | |
| 2011/0278006 A1 | 11/2011 | Sanders | |
| 2012/0157354 A1 | 6/2012 | Li et al. | |
| 2012/0247763 A1 | 10/2012 | Rakitsky et al. | |
| 2013/0025863 A1 | 1/2013 | Lin et al. | |
| 2014/0038857 A1 | 2/2014 | Miller et al. | |
| 2014/0102987 A1 | 4/2014 | Yusuf et al. | |
| 2014/0110177 A1 | 4/2014 | Harr | |
| 2014/0135237 A1 | 5/2014 | Villarreal, Jr. et al. | |
| 2014/0209290 A1 | 7/2014 | Jamison et al. | |
| 2014/0231082 A1 | 8/2014 | Jamison et al. | |
| 2014/0262281 A1 | 9/2014 | Kulkarni et al. | |
| 2014/0318793 A1 | 10/2014 | Van Petergem et al. | |
| 2014/0353043 A1 | 12/2014 | Amanullah et al. | |
| 2015/0008044 A1 | 1/2015 | Fontenot | |
| 2015/0051120 A1 | 2/2015 | Hurd et al. | |
| 2015/0072901 A1 | 3/2015 | Samuel et al. | |
| 2015/0166875 A1 | 6/2015 | Bird et al. | |
| 2015/0247081 A1 | 9/2015 | Dillon et al. | |
| 2015/0251156 A1 | 9/2015 | Yusuf et al. | |
| 2016/0060985 A1 | 3/2016 | Lin et al. | |
| 2016/0096988 A1 | 4/2016 | Lin et al. | |
| 2016/0177164 A1 | 6/2016 | Dillon et al. | |
| 2016/0222274 A1 | 8/2016 | Hoskins | |
| 2016/0222275 A1 | 8/2016 | Galindo et al. | |
| 2016/0257869 A1 | 9/2016 | Kulkarni et al. | |
| 2016/0289528 A1 | 10/2016 | Wagle et al. | |
| 2016/0312100 A1 | 10/2016 | Amanullah et al. | |
| 2017/0058180 A1 | 3/2017 | Hossain et al. | |
| 2017/0137688 A1 | 5/2017 | Amanullah | |
| 2017/0166795 A1 | 6/2017 | Walker et al. | |
| 2017/0240791 A1 | 8/2017 | Oliveira et al. | |
| 2017/0298263 A1 | 10/2017 | Amanullah | |
| 2018/0002588 A1 | 1/2018 | Amanullah | |
| 2018/0002589 A1 | 1/2018 | Amanullah | |
| 2018/0016483 A1 | 1/2018 | Amanullah | |
| 2018/0057729 A1 | 3/2018 | Amanullah | |
| 2018/0201819 A1 | 7/2018 | Amanullah | |
| 2019/0177593 A1 | 6/2019 | Amanullah | |
| 2019/0177594 A1 | 6/2019 | Amanullah | |
| 2019/0177595 A1 | 6/2019 | Amanullah | |
| 2019/0185731 A1 | 6/2019 | Amanullah | |

(56) References Cited

U.S. PATENT DOCUMENTS

| | | |
|---|---|---|
| 2019/0185732 A1 | 6/2019 | Amanullah |
| 2019/0194519 A1 | 6/2019 | Amanullah |
| 2019/0233705 A1 | 8/2019 | Amanullah et al. |
| 2019/0270924 A1 | 9/2019 | Amanullah |
| 2020/0002592 A1 | 1/2020 | Amanullah |
| 2020/0079987 A1 | 3/2020 | Amanullah |
| 2020/0079988 A1 | 3/2020 | Amanullah |

FOREIGN PATENT DOCUMENTS

| | | |
|---|---|---|
| CN | 102127403 A | 7/2011 |
| CN | 203035080 U | 7/2013 |
| CN | 103740346 A | 4/2014 |
| CN | 104087274 A | 10/2014 |
| CN | 104419392 A | 3/2015 |
| GB | 2506603 A | 4/2014 |
| JP | 0671171 A | 3/1994 |
| WO | 200153429 A1 | 7/2001 |
| WO | 2004013448 A2 | 2/2004 |
| WO | 2010019535 A2 | 2/2010 |
| WO | 2010088484 A2 | 8/2010 |
| WO | 2010142370 A1 | 12/2010 |
| WO | 2012037600 A1 | 3/2012 |
| WO | 2012061187 A2 | 5/2012 |
| WO | 2013039938 A1 | 3/2013 |
| WO | 2014008598 A1 | 1/2014 |
| WO | 2014197417 A1 | 12/2014 |
| WO | 2015142156 A1 | 9/2015 |
| WO | 2015199652 A1 | 12/2015 |
| WO | 2016019416 A1 | 2/2016 |
| WO | 2016028470 A1 | 2/2016 |
| WO | 2016172287 A1 | 10/2016 |
| WO | 2017087434 A1 | 5/2017 |
| WO | 2018005575 A1 | 1/2018 |
| WO | 2018013619 A1 | 1/2018 |

OTHER PUBLICATIONS

"Wood Shop News, Issue #08 Hard and softwoods, a unique food bank, and more news from around the shop" available as of Oct. 8, 2018 at the website: https://www.wooden-box-maker.com/Wood_Shop_News-hardwoods-and-softwoods.html.

Alawad, Musaed N.J., et al.; "Superior fracture-seal material using crushed date palm seeds for oil and gas well drilling operations" Journal of King Saud University—Engineering Sciences (2017); pp. 1-7.

Al-Awad, Musaed NJ et al.; "Utilization of Shredded Waste Car Tyres as a Fracture Seal Material (FSM) in Oil and Gas Drilling Operations" Journal of Petroleum & Environmental Biotechnology, (2017) vol. 8, Issue 2; pp. 1-4.

Alsaba, M. et al.; "Review of lost circulation materials and treatments with an updated classification." AADE National Technical Conference and Exhibition, Houston, TX, Apr. 2014; pp. 1-9.

Amanullah, et al.; "Application of an indigenous eco-friendly raw material as fluid loss additive", Journal of Petroleum Science and Engineering, vol. 139, (2016); pp. 191-197.

Amanullah; "Characteristics, behavior and performance of ARC Plug—A date seed-based sized particulate LCM." SPE Kingdom of Saudi Arabia Annual Technical Symposium and Exhibition. Society of Petroleum Engineers, 2016; pp. 1-9.

BakerHughes.com "SOLUFLAKE Flaked Calcium Carbonate" (XP055401101) Jan. 8, 2016; p. 1.

International Search Report and Written Opinion for International Application No. PCT/US2016/062130 (SA5410/PCT); dated Jan. 27, 2017; pp. 1-12.

International Search Report and Written Opinion for International Application No. PCT/US2017/027287 (SA5508/PCT); dated Sep. 13, 2017; 11 pages.

International Search Report and Written Opinion for International Application No. PCT/US2017/039614 (SA5532/PCT); dated Sep. 11, 2017; pp. 1-12.

International Search Report and Written Opinion for International Application No. PCT/US2017/039616 (SA5533/PCT); dated Sep. 11, 2017; pp. 1-11.

International Search Report and Written Opinion for International Application No. PCT/US2017/047877 (SA5599/PCT); dated Oct. 27, 2017; pp. 1-15.

International Search Report and Written Opinion for International Application No. PCT/US2017/053355 (SA5580/PCT); International filing date Sep. 26, 2017; dated Jan. 17, 2018; pp. 1-14.

International Search Report and Written Opinion for International Application No. PCT/US2017/060079 (SA5577/PCT); International Filing Date Nov. 6, 2017; dated Dec. 18, 2017; pp. 1-14.

International Search Report and Written Opinion for International Application No. PCT/US2017/067179 (SA5600/PCT) International Filing Date Dec. 19, 2017; dated Feb. 21, 2018; pp. 1-14.

International Search Report and Written Opinion for International Application No. PCT/US2017/041611 (SA5534); International Filing Date Jul. 12, 2017; dated Oct. 27, 2017 (pp. 1-15).

International Search Report and Written Opinion for International Application No. PCT/US2018/034291 (SA5652/PCT); International Filing Date May 24, 2018; dated Jul. 31, 2018 (pp. 1-11).

International Search Report and Written Opinion for International Application No. PCT/US2018/048423 (SA5757); International Filing Date Aug. 29, 2018; dated Nov. 29, 2018 (pp. 1-12).

Saudi Aramco "Local palm trees support technical solutions" Dhahran, Aug. 4, 2015; available as of Sep. 19, 2018 at the website: www.saudiaramco.com/en/home/news-media/news/local-palm-trees-support.html.

International Search Report and Written Opinion for International Application No. PCT/US2019/016614 (SA5796) dated Jun. 3, 2019; pp. 1-12.

International Search Report and Written Opinion for International Application No. PCT/US2019/022843 (SA5854) dated Jun. 3, 2019; pp. 1-13.

Wajheeuddin, M. et al.; "An Experimental Study on Particle Sizing of Natural Substitutes for Drilling Fluid Applications." Journal of Nature Science and Sustainable Technology vol. 8, No. 2 (2014); pp. 1-14.

* cited by examiner

DATE TREE WASTE-BASED TRINARY FIBROUS MIX FOR MODERATE TO SEVERE LOSS CONTROL

CROSS-REFERENCE TO RELATED APPLICATIONS

This application is a divisional of and claims priority from U.S. Non-provisional application Ser. No. 15/689,074 filed Aug. 29, 2017, and titled "ARC FIBER TRIO-DATE TREE WASTE-BASED TRINARY FIBROUS MIX FOR MODERATE TO SEVERE LOSS CONTROL, which claims priority from U.S. Provisional Application No. 62/436,211 filed Dec. 19, 2016, and titled "DATE TREE WASTE-BASED BINARY FIBROUS MIX FOR MODERATE TO SEVERE LOSS CONTROL," each of which are incorporated by reference in their entirety for purposes of United States patent practice.

BACKGROUND

Field of the Disclosure

The present disclosure generally relates to controlling lost circulation in a wellbore during drilling with a drilling fluid. More specifically, embodiments of the disclosure relate to a lost circulation material (LCM).

Description of the Related Art

Lost circulation is one of the frequent challenges encountered during drilling operations. Lost circulation can be encountered during any stage of operations and occurs when drilling fluid (such as drilling mud) pumped into a well returns partially or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations, cavernous formations, and high permeable formations. Lost circulation can be categorized by the amount of fluid or mud lost as seepage type, moderate type, severe type, and total loss. The extent of the fluid loss and the ability to control the lost circulation with an LCM depends on the type of formation in which the lost circulation occurs. Formations with low permeability zones, that is, those with microscopic cracks and fissures, usually have seepage type lost circulation. Other formations may experience lost circulation if an improper mud weight is used while drilling.

SUMMARY

Lost circulation materials (LCMs) are used to mitigate the lost circulation by blocking the path of the drilling fluid (such as drilling mud) into the formation. The type of LCM used in a lost circulation situation depends on the extent of lost circulation and the type of formation. Different types of LCMs such as granular, fibrous and flaky materials are frequently used either alone or in combination to control loss of circulation. For example, fibrous LCMs may include cedar fibers, wood fibers, jute fibers, or synthetic fibers to control loss of circulation. Fibrous LCMs may be used for controlling loss of whole mud into porous and permeable formations, fractured and vugular formations, and formations with cavernous loss zones.

Costs incurred in loss circulation situations may be due to losses of drilling fluids, losses of production, and the costs of LCMs, including importation of LCMs to drilling locations. Additionally, lost circulation can cause environmental problems if drilling fluids or LCMs interact with the environment surrounding the reservoir. The manufacture, use, and disposal of some conventional LCMs may pose a risk to sensitive environments, such as marine environments because they are not biodegradable and can be toxic to marine life.

In one embodiment, a method to control lost circulation in a lost circulation zone in a wellbore is provided. The method includes introducing an altered drilling fluid into the wellbore such that the altered drilling fluid contacts the lost circulation zone and reduces a rate of lost circulation into the lost circulation zone. The altered drilling fluid includes a drilling fluid and a lost circulation material (LCM), such that the LCM includes a first plurality of fibers produced from date tree trunks, a second plurality of fibers produced from at least one of date tree leaves and date tree leaf stems, and a third plurality of fibers produced from date tree panicles. In some embodiments, the altered drilling fluid consists of the drilling fluid and the LCM. In some embodiments, the LCM consists of the first plurality of fibers produced from date tree trunks, the second plurality of fibers produced from at least one of date tree leaves and date tree leaf stems, and the third plurality of fibers produced from date tree panicles. In some embodiments, the first plurality of fibers is 30% by weight of the LCM, the second plurality of fibers is 30% by weight of the LCM, and the third plurality of fibers is 40% by weight of the LCM. In some embodiments, the LCM has a concentration of at least 30 pounds-per-barrel (ppb) in the altered drilling fluid. In some embodiments, each of the first plurality of fibers produced from date tree trunks has a diameter in the range of 0.4 millimeters (mm) to about 0.8 mm. In some embodiments, each of the second plurality of fibers produced from at least one of date tree leaves and date tree leaf stems has a diameter in the range of 0.5 millimeters (mm) to about 1 mm. In some embodiments, each of the third plurality of fibers produced from date tree panicles has a diameter in the range of about 0.5 mm to about 1 mm. In some embodiments, the first plurality of fibers include a first plurality of untreated fibers, the second plurality of fibers include a second plurality of untreated fibers, and third plurality of fibers include a third plurality of untreated fibers.

In another embodiment, an altered drilling fluid is provided that includes a drilling fluid and a lost circulation material (LCM), such that the LCM includes a first plurality of fibers produced from date tree trunks, and a second plurality of fibers produced from at least one of date tree leaves and date tree leaf stems, and a third plurality of fibers produced from date tree panicles. In some embodiments, the LCM consists of the first plurality of fibers produced from date tree trunks, the second plurality of fibers produced from at least one of date tree leaves and date tree leaf stems, and the third plurality of fibers produced from date tree panicles. In some embodiments, the first plurality of fibers is 30% by weight of the LCM, the second plurality of fibers is 30% by weight of the LCM, and the third plurality of fibers is 40% by weight of the LCM. In some embodiments, the LCM has a concentration of at least 30 pounds-per-barrel (ppb) in the altered drilling fluid. In some embodiments, each of the first plurality of fibers produced from date tree trunks has a diameter in the range of 0.4 millimeters (mm) to about 0.8 mm. In some embodiments, each of the second plurality of fibers produced from at least one of date tree leaves and date tree leaf stems has a diameter in the range of 0.5 millimeters (mm) to about 1 mm. In some embodiments, each of the third plurality of fibers produced from date tree panicles has a diameter in the range of about 0.5 mm to about 1 mm. In some embodiments, the first plurality of fibers include a first plurality of untreated fibers, the second plurality of fibers include a second plurality of untreated fibers, and third plurality of fibers include a third plurality of untreated fibers.

In another embodiment, lost circulation material (LCM) composition is provided that includes a first plurality of fibers produced from date tree trunks, a second plurality of fibers produced from at least one of date tree leaves and date tree leaf stems, and a third plurality of fibers produced from date tree panicles. In some embodiments, the LCM consists of the first plurality of fibers produced from date tree trunks, the second plurality of fibers produced from at least one of date tree leaves and date tree leaf stems, and the third plurality of fibers produced from date tree panicles. In some embodiments, the first plurality of fibers is 30% by weight of the LCM, the second plurality of fibers is 30% by weight of the LCM, and the third plurality of fibers is 40% by weight of the LCM. In some embodiments, each of the first plurality of fibers produced from date tree trunks has a diameter in the range of 0.4 millimeters (mm) to about 0.8 mm. In some embodiments, each of the second plurality of fibers produced from at least one of date tree leaves and date tree leaf stems has a diameter in the range of 0.5 millimeters (mm) to about 1 mm. In some embodiments, each of the third plurality of fibers produced from date tree panicles has a diameter in the range of about 0.5 mm to about 1 mm. In some embodiments, the first plurality of fibers include a first plurality of untreated fibers, the second plurality of fibers include a second plurality of untreated fibers, and third plurality of fibers include a third plurality of untreated fibers.

In another embodiment, a method of forming a lost circulation material (LCM) is provided. The method includes grinding date tree trunks to produce a first plurality of fibers, grinding date tree leaves, leaf stems, or a combination thereof to produce a second plurality of fibers, and grinding date tree panicles to produce a third plurality of fibers. The method also includes mixing a first amount of the first plurality of fibers, a second amount of the second plurality of fibers, and a third amount of the third plurality of fibers to form the LCM. In some embodiments, the method includes washing the date tree trunks before grinding the date tree trunks, washing the date tree leaves, leaf stems, or a combination thereof before grinding the date tree leaves, the leaf stems, or a combination thereof, and washing the date tree panicles before grinding the date tree panicles. In some embodiments, the first amount of the first plurality of fibers is 30% by weight of the LCM, the second amount of the second plurality of fibers is 30% by weight of the LCM, and the third amount of the third plurality of fibers is 40% by weight of the LCM

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the flow rate of the drilling fluid that returns to the surface is less than the flow rate of the drilling fluid pumped into the wellbore. It is this reduction or absence of returning drilling fluid that is referred to as lost circulation.

Embodiments of the disclosure include a date tree fiber mix LCM that includes a trinary mix of date tree fibers obtained from date tree waste to mitigate or prevent lost circulation in a well, as well as provide seepage control and minimize or prevent fluid loss. As used in the disclosure, the term date tree waste refers to the waste produced from farming and processing date trees (also referred to as "date palms"), such as in the production of date fruits (also referred to as "dates"). The date tree fiber mix LCM is a trinary fiber mix that includes fibers formed from date tree trunks, fibers formed from date tree leaves and leaf stems, and fibers formed from date tree panicles. As will be appreciated, each date tree panicle may include date tree spikelets which, in some embodiments, may also be used in the formation of fibers from the date tree panicles.

Figure 1:
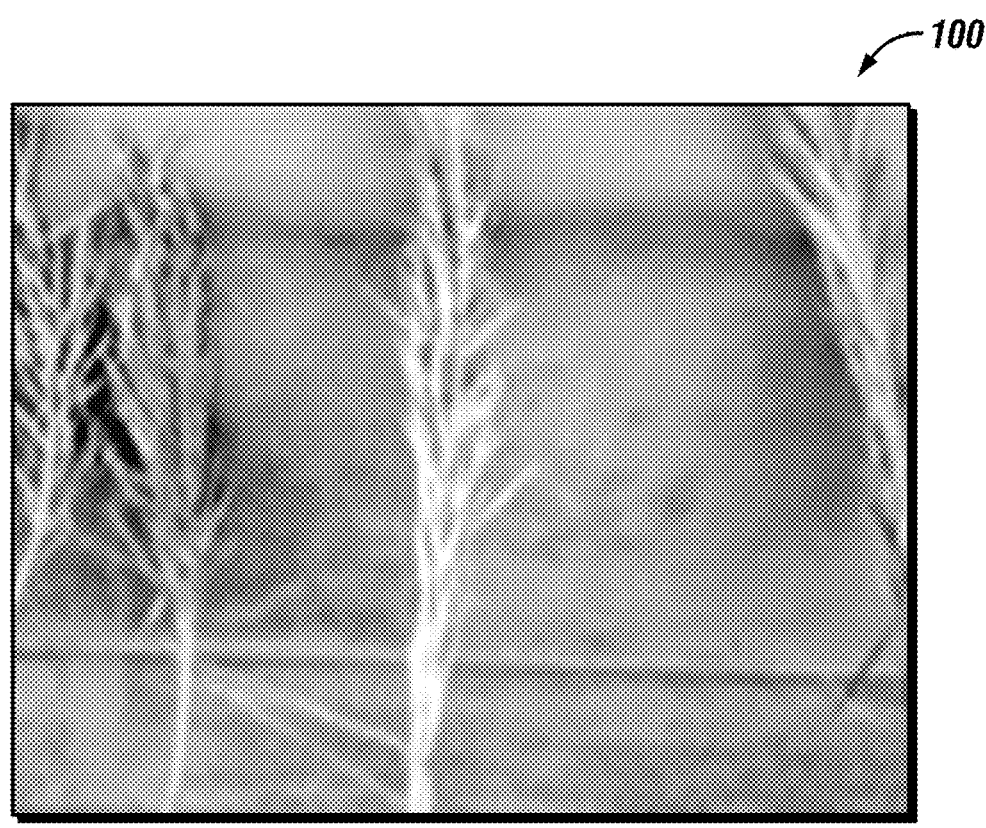
FIG. 1 is a photograph of date tree trunks of date tree leaves and leaf stems produced from date trees in accordance with an embodiment of the disclosure.
Figure 2:
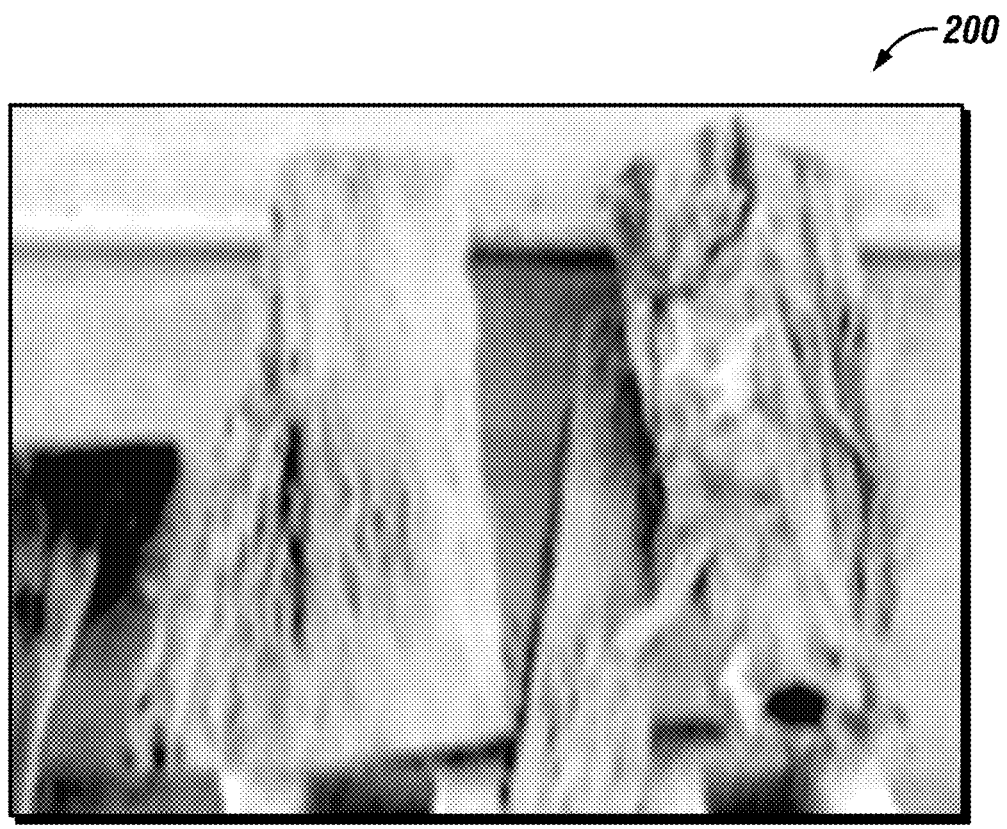
FIG. 2 is a photograph of date tree trunks produced from date trees in accordance with an embodiment of the disclosure.
Figure 3:
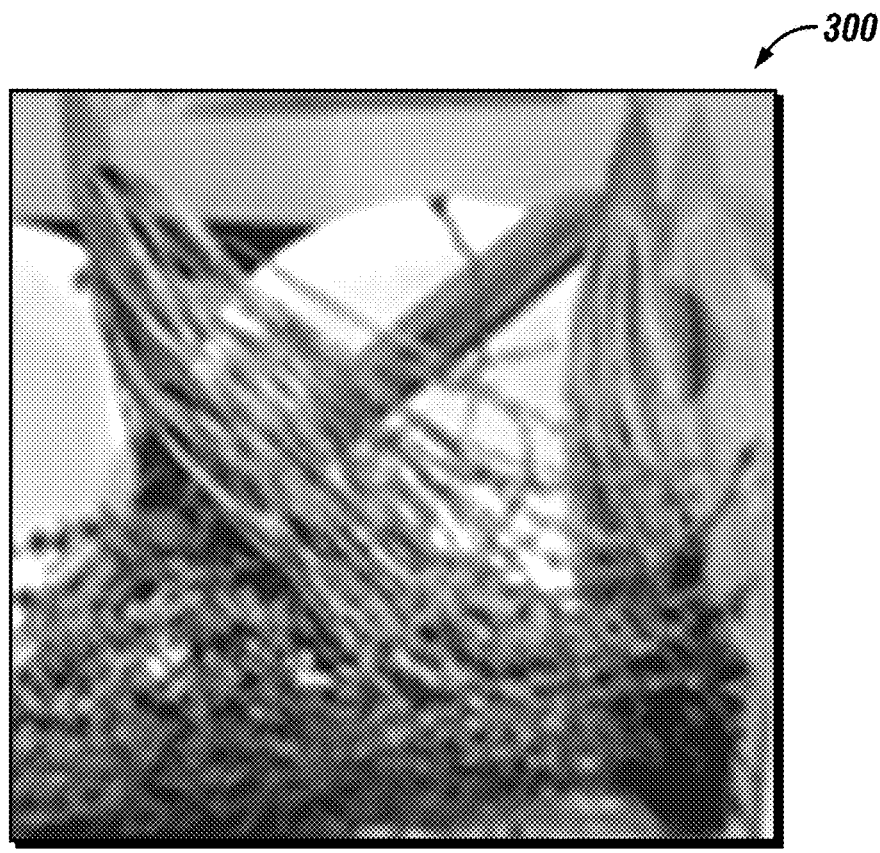
FIG. 3 is a photograph of date tree panicles produced from date trees in in accordance with an embodiment of the disclosure.

FIG. 1 is a photograph 100 of date tree leaves and leaf stems from deceased date trees in accordance with an embodiment of the disclosure. As discussed in the disclosure, fibers manufactured from the date tree leaves and leaf stems may be relatively tough and inflexible as compared to the fibers manufactured from date tree trunks. FIG. 2 is a photograph 200 of date tree trunks from deceased date trees in accordance with an embodiment of the disclosure. As discussed in the disclosure, fibers manufactured from the date tree trunks may be relatively flexible, soft, bendable, and adaptable as compared to the fibers manufactured from date tree leaves and leaf stems. Finally FIG. 3 depicts a photograph 300 of date tree panicle fibers from deceased date trees in accordance with an embodiment of the disclosure. As discussed in the disclosure, fibers manufactured from the date tree panicles may be relatively strong, robust, and high-load bearing as compared to the fibers manufactured from date tree trunks. The various date tree fibers are composed of cellulose, hemicellulose, and ligin, and may also include ash. As will be appreciated, each type of date tree fiber used in the LCM described in the disclosure has different amounts of cellulose, hemicellulose, and ligin. The compositions of each fiber are shown in Table 1:

TABLE 1

Composition of Different Date Tree Fiber Sources

| Fiber Source | Cellulose Content (%) | Ligin Content (%) | Hemicellulose Content (%) |
|---|---|---|---|
| Trunk | 39.37 | 30.32 | 30.31 |
| Leaflets | 47.14 | 36.73 | 16.13 |
| Panicle | 44.05 | 31.30 | 24.30 |

With the foregoing in mind, a date tree fiber mix LCM may, in some embodiments, include a trinary fiber mix having fibers formed from date tree leaves and leaf stems, fibers formed from date tree trunks, and fibers formed from date tree panicles. In some embodiments, a date tree fiber mix LCM may include 30% by weight date tree trunk fibers, 30% by weight date tree leaf and leaf stem fibers, and 40% by weight date tree panicle fibers. In some embodiments, the date tree fiber mix LCM may include date tree trunk fibers in the range of 20% by weight to 40% by weight, date tree leaf and leaf stem fibers in the range of 20% by weight to 40% by weight, and date tree panicle fibers in the range of 60% by weight to 20% by weight.

In some embodiments, the date tree fiber mix LCM may include fibers having an aspect ratio in the range of about 5 to about 50. In some embodiments, the date tree trunk fibers may include fibers having the following distribution, as determined by the diameters of the fibers passed or retained in mesh openings: about 35% to about 55% of fibers passing through sieve mesh no. 10 and retained in sieve mesh no. 18, about 35% to about 55% of fibers passing through sieve mesh no. 18 and retained in sieve mesh no. 60, and about 5% to about 15% of fibers passing through sieve mesh no. 60 and retained in sieve mesh no. 200. In some embodiments, the date tree trunk fibers have diameters in the range of about 0.4 mm to about 0.8 mm with an average diameter of about 0.6 mm. In some embodiments, date tree leaf and leaf stem fibers may include fibers having the following distribution, as determined by the diameters of the fibers passed or retained in the mesh openings: about 55% to about 75% of fibers passing through sieve mesh no. 10 and retained in sieve mesh no. 18, about 15% to about 35% of fibers passing through sieve mesh no. 18 and retained in sieve mesh no. 60, and about 4% to about 16% of fibers passing through sieve mesh no. 60 and retained in sieve mesh no. 200. In some embodiments, the date tree leaf and leaf stem fibers have diameters in the range of about 0.5 mm to about 1 mm with an average diameter of about 0.75 mm. In some embodiments, date tree panicle fibers may include fibers having the following distribution, as determined by the diameters of the fibers passed or retained in the mesh openings: about 55% to about 75% of fibers passing through sieve mesh no. 10 and retained in sieve mesh no. 18, about 15% to about 35% of fibers passing through sieve mesh no. 18 and retained in sieve mesh no. 60, and about 4% to about 16% of fibers passing through sieve mesh no. 60 and retained in sieve mesh no. 200. In some embodiments, the date tree panicle fibers have diameters in the range of about 0.5 mm to about 1 mm with an average diameter of about 0.75 mm.

Figure 4:
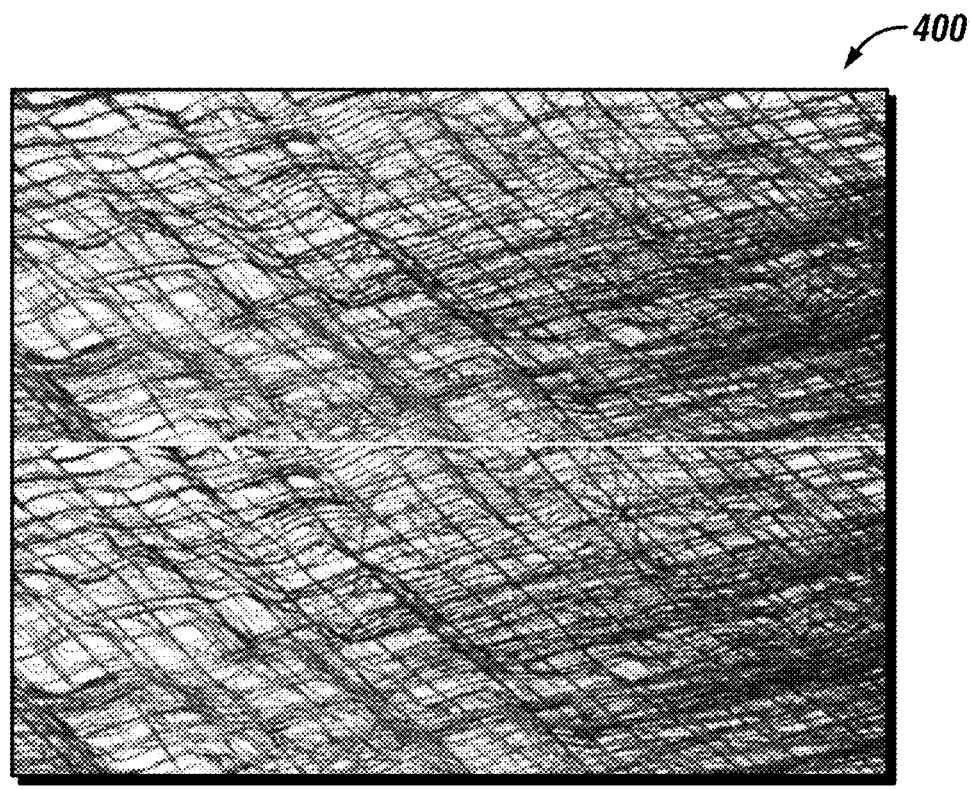
FIG. 4 is a schematic diagram illustrating a fiber network formed by fibers produced from date tree leaves and leaf stems.
Figure 5:
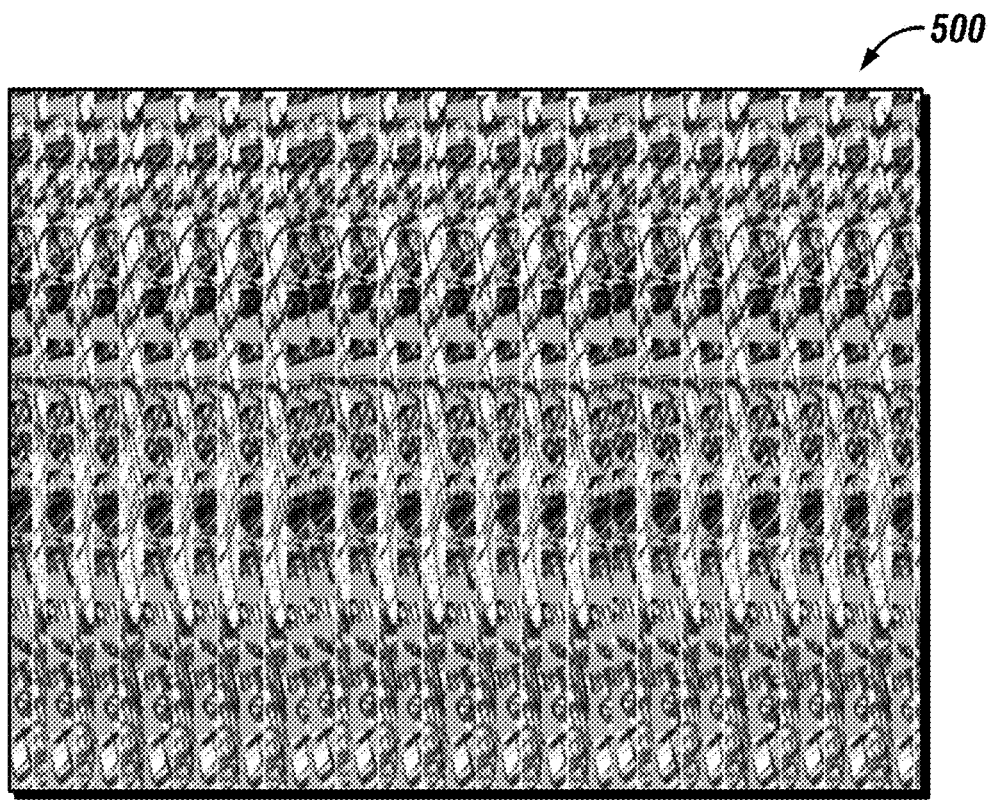
FIG. 5 is a schematic diagram of a fiber network formed by date tree leaf and leaf stem fibers and fibers produced from date tree trunks in accordance with an embodiment of the disclosure.
Figure 6:
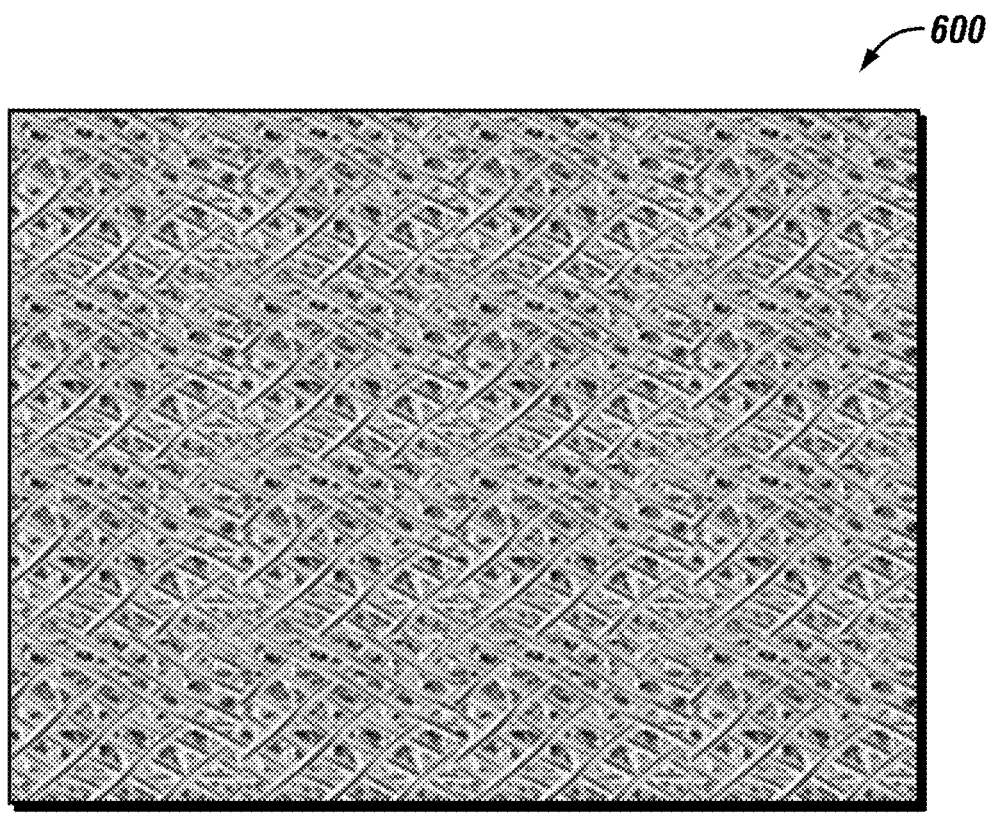
FIG. 6 is a schematic diagram of a fiber network formed by date tree leaf and leaf stem fibers, date tree trunk fibers, and fibers produced from date tree panicles in accordance with an embodiment of the disclosure.

The presence of three types of fibers with different physical, mechanical, chemical and thermal properties may enable the date tree fiber mix LCM to form tightly packed plugs and seals in cracks and fractures in loss zones to provide improved control of the loss of whole mud from the borehole to the surrounding formation, as compared to conventional and existing fiber LCMs. For example, FIG. 4 is a schematic diagram illustrating a fiber network 400 formed by fibers manufactured from date tree leaves and leaf stems. The fiber network 400 illustrates a relatively larger mesh network formed by the relatively tough and inflexible date tree leaf and leaf stem fibers, as compared to more flexible fibers. The fiber network 400 may not have sufficient structural support to withstand greater overbalance pressures that may typically be encountered in well drilling. FIG. 5 is a schematic diagram of a fiber network 500 formed by the date tree leaf and leaf stem fibers and fibers produced from date tree trunks in accordance with an embodiment of the disclosure. The fiber network 500 illustrates the interlacing and interweaving enabled by the relatively flexible date tree trunk fibers. FIG. 6 is a schematic diagram of a fiber network 600 formed by the date tree leaf and leaf stem fibers date tree trunk fibers, and fibers formed from date tree panicles that illustrates the contrast with the fiber networks formed from date tree leaves and leaf stems fibers or a combination of date tree leaves and leaf stems fibers and date tree trunk fibers. As compared to the fiber networks 400 and 500, the fiber network 600 may provide for the formation of a strong network of fibers having a relatively lower permeability due to the intertwined, interlaced, and tightly knitted structure produced by the combination of the three fibers.

The fiber network 600 may provide for the formation of tightly packed, rigid, low permeability and pressure tolerant structure (for example, plugs and seals) within the fractures, gaps, fissures, cracks, faults and other openings of a formation to prevent the loss of whole mud during drilling or other operations. In some embodiments, the fiber network 600 may create a flow barrier to completely prevent whole mud losses or, in some instances, partially prevent whole mud losses, depending on the nature of the subsurface loss zone. The combination of the three types of fibers may improve the flow barrier and load bearing properties, strength, and fiber network formation of the date tree fiber mix LCM as compared to other fibrous LCMs, due to the different physical and mechanical properties of each type of fiber in the mix. For example, the fiber network 600 may have improved mechanical and structural strength, load bearing capacity, and pressure tolerance as compared to a single fiber LCM. In some instances, colloidal and other mud solids may infiltrate into and deposit on the fiber network 600 to further form a flow barrier the prevent or minimize the loss of whole mud in a loss zone.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting example of a date tree fiber mix LCM was prepared and evaluated against a commercially available LCM. Plugging efficiency tests were conducted on the date tree fiber mix LCM and a commercially available LCM using a 2 millimeter (mm) slotted disc and a Permeability Plugging Tester (also referred to as "PPT" or "Pore Plugging Test" apparatus) manufactured by OFI Testing Equipment, Inc., of Houston, Tex., USA. The tests were conducted at conditions of about 212° F. and about 1000 psi differential pressure. For the plugging efficiency tests, the date tree fiber mix LCM and commercially available LCMs were incorporated into a 65 pounds per cubic foot (pcf) bentonite mud. The composition of the 65 pcf bentonite mud with mud components expressed in pounds-per-barrels (lb/bbl) is shown in Table 2:

TABLE 2

Composition of 65 pcf bentonite mud

| Mud Component | lb/bbl |
|---|---|
| Water | 340.67 |
| Bentonite | 25.00 |
| Caustic Soda | 0.25 |
| Soda Ash | 0.25 |

An example formulation of a date tree fiber mix LCM was prepared and tested. The date tree trunk fibers used in the formulation had diameters in the range of about 0.4 mm to about 0.8 mm with an average diameter of about 0.6 mm. The date tree trunk fibers used in the example formulation had the following distribution, as determined by the diameters of the fibers passed or retained in mesh openings: about 35% to about 55% of fibers passing through sieve mesh no. 10 and retained in sieve mesh no. 18, about 35% to about 55% of fibers passing through sieve mesh no. 18 and retained in sieve mesh no. 60, and about 5% to about 15% of fibers passing through sieve mesh no. 60 and retained in sieve mesh no. 200. The date tree leaf and leaf stem fibers used in the example formulation had diameters in the range of about 0.5 mm to about 1 mm with an average diameter of about 0.75 mm. The date tree leaf and leaf stem fibers used in the example formulation had the following distribution, as determined by the diameters of the fibers passed or retained in the mesh openings: about 55% to about 75% of fibers passing through sieve mesh no. 10 and retained in sieve mesh no. 18, about 15% to about 35% of fibers passing through sieve mesh no. 18 and retained in sieve mesh no. 60, and about 4% to about 16% of fibers passing through sieve mesh no. 60 and retained in sieve mesh no. 200. The date tree panicle fibers used in the example formulation had diameters in the range of about 0.5 mm to about 1 mm with an average diameter of about 0.75 mm. The date tree panicle fibers using the example formulation had the following distribution, as determined by the diameters of the fibers passed or retained in the mesh openings: about 55% to about 75% of fibers passing through sieve mesh no. 10 and retained in sieve mesh no. 18, about 15% to about 35% of fibers passing through sieve mesh no. 18 and retained in sieve mesh no. 60, and about 4% to about 16% of fibers passing through sieve mesh no. 200.

An example formulation was prepared from 30% by weight date tree trunk fibers, 30% by weight date tree leaf and leaf stem fibers, and 70% by weight date tree panicle fibers. The example formulation was evaluated to determine the improvement to the sealing and plugging capacity provided by the trinary fiber mix. The example date tree fiber mix LCM formulation, a single fiber LCM formulation having 100% date tree trunk fibers, and a commercially available LCM were tested using the Permeability Plugging Tester apparatus and the following plugging efficiency test procedure:

1. Set the temperature controller/thermostat to the testing temperature;
2. Check the condition of the O-rings in the groove at the top of the test cell of the Permeability Plugging Tester apparatus and in the cell end cap and replace the O-rings if needed;
3. Apply a thin coating of high temperature grease to all the O-rings, including the two O-rings on the piston of the Permeability Plugging Tester apparatus;
4. Screw the T-bar of the Permeability Plugging Tester apparatus into the piston, install into the bottom end of the test cell, position the piston about 1 inch into the cell bore, and remove the T-bar;
5. Add a volume of hydraulic oil to the test cell using the hydraulic hand pump of the Permeability Plugging Tester apparatus;
6. Install all the O-rings and secure the end cap of the cell in position such that oil flows from the hole in the end cap to ensure no air is trapped;
7. Install the valve stem into the bottom end cap of the cell, tighten the valve stem, and disconnect from the hydraulic hand pump of the Permeability Plugging Tester apparatus;
8. Place the cell upright on a suitable stand;
9. Pour a test sample of a homogenous mixture of 275 ml of the 65 pcf bentonite mud and 30 grams of an LCM into the test cell;
10. Install an O-ring into the top of the cell below the 2 mm slotted disc;
11. Place the 2 mm slotted disc on top of the O-ring;
12. Insert the end cap on the top of the disc, screw down the threaded retaining ring, and fully tighten;
13. Tighten the top stem of the test cell;
14. Place the cell into the heating jacket of the Permeability Plugging Tester apparatus;
15. Connect a pressure hose from the hydraulic hand pump to the bottom of the test cell via a quick connector and ensure the bottom stem is closed;
16. Connect the back pressure hose/sample collector to the top stem of the test cell, ensuring that the locking pin is in place, close the pressure relief valve on the side of the hydraulic hand pump, apply the testing pressure via the back pressure regulator to the top of the test cell, and close the top valve.
17. Place a thermometer into the hole at the top of the test cell. Wait until the testing temperature is reached, and monitor the cell pressure while heating and bleed off pressure if necessary by opening the pressure relived valve on the side of the hydraulic hand pump;
18. Once the test sample has reached the testing temperature, pump the hydraulic hand pump until the pump gauge shows the testing pressure plus the required back pressure;
19. Apply the required back pressure to the top of the cell, open the top valve, and pump the hydraulic hand pump to reestablish the testing pressure;
20. To determine the spurt volume, collect the fluid from the back pressure collector in a measuring cylinder and record the amount, ensuring that all the fluid has been expelled;

21. Collect the fluid periodically over a 30 minute time period and check the back pressure gauge to ensure that the pressure remains less than the pressure threshold (about 3000 psi) of the built-in safety disc of the Permeability Plugging Tester apparatus and avoid expulsion of hot hydraulic oil;

22. Record the spurt loss, total leak off, and PPT values over the 30 minute time period and record the cake thickness after dismantling the test cell.

The example formulation of the date tree fiber mix LCM was tested against a commercially available cellulosic fiber and flake LCM, STOPLOSS® manufactured by Drilchem of Jakarta, Indonesia. Table 3 shows the results of plugging efficiency tests for the single fiber LCM at a 30 pounds-per-barrel (ppb) concentration in the 65 pcf bentonite mud, the example formulation of the date tree fiber mix LCM at a 30 ppb concentration in the 65 pcf bentonite mud, and STOPLOSS® at a 30 ppb concentration in the 65 pcf bentonite mud, with the spurt loss, fluid loss, total leak off, and PPT value measured in cubic centimeters (cc) and the cake thickness measured in mm:

TABLE 3

Plugging Efficiency Test Results for Date tree fiber mix LCM and Commercially Available LCM

| LCM | Concentration | Spurt Loss (cc) | Fluid Loss (cc) | Total Leak Off (cc) | Cake Thickness (mm) | PPT Value (cc) |
|---|---|---|---|---|---|---|
| 100% Date tree trunk fibers | 30 ppb | 2 | 30 | 32 | 6.32 | 64 |
| 30% Date tree trunk fibers: 30% date tree leaf and leaf stem fibers; 70% date tree panicle fibers | 30 ppb | 1 | 10 | 11 | 12.6 | 22 |
| STOPLOSS ® | 30 ppb | 0.7 | 16 | 16.7 | 3.97 | 33.4 |

As shown in Table 3, the single fiber LCM having 100% date tree trunk fibers allowed significant fluid loss and failed to prevent fluid from escaping before sealing the slots of the disc in the PPT apparatus and stopping the loss of whole mud. The relatively flexible and bendable date tree trunk fibers of the single fiber LCM required a longer time to create an effective flow barrier in the disc slots. As also shown in Table 3, due to the relatively higher compressibility of the date tree trunk fibers, the resulting cake formed during the plugging efficiency tests was less thick than the cake formed by the date tree fiber mix LCM formulation. The plugging efficiency tests showed that the use of the strong and high load bearing date tree panicle fibers in the example date tree fiber mix LCM created an improved structural support for the fiber network to trap the relatively strong and inflexible date tree leaf and leaf stem fibers and allowed the more flexible date tree trunk fibers to intertwine through the fiber network, enabling the quicker formation of an effective flow barrier in the slots of the PPT disc and significantly reducing fluid loss, as compared to the LCM having 100% date tree trunk fibers. Thus, the blending of date tree trunk fibers, date tree leaf and leaf stem fibers, and date tree panicle fibers may improve the barrier-forming characteristics of the LCM formed from date tree fibers.

As shown in Table 3, the example date tree fiber mix LCM formulation exhibited reduced spurt loss, fluid loss, and total leak off as compared to the LCM having 100% date tree trunk fibers. As further shown in Table 3, the example date tree fiber mix LCM formulation showed superior performance as compared to the STOPLOSS® commercially available LCM. The example date tree fiber mix LCM formulation exhibited reduced fluid loss, reduced total leak off, and formed a thicker cake than the STOPLOSS® commercially available LCM. The formation of the thicker plug illustrates the greater resistance to compressive forces during the test as compared to the STOPLOSS® commercially available LCM. As shown by the results, the three types of the fibers in the date tree fiber mix LCM enhances the ability of the fiber network to form a tightly packed seal or plug that acts as a flow barrier to prevent or minimize the loss of whole mud. Thus, the date tree waste fiber mix LCM having the trinary mix of date tree fibers may be a viable alternative to commercially available LCMs.

Date Tree Fiber Mix LCM Manufacture and Use

In some embodiments, a date tree fiber mix LCM may include date tree trunk fibers, a date tree leaf and leaf stem fibers, and date tree panicle fibers. The date tree trunk fibers include fibers manufactured from date tree trunks. The date tree leaf and leaf stem fibers include fibers manufactured from date tree leaves and leaf stems. The date tree panicle fibers include fibers manufacture from date tree panicles. The date tree trunks, date tree leaves and leaf stems, and date tree panicles may be obtained from date tree waste produced as a waste by-product from date tree farming and date processing. The date tree waste may be obtained from pruning waste and date processing plants to provide a sustainable source of material for the date tree fiber mix LCM. Moreover, local sources of date tree waste may reduce the cost of imported LCM products, components, or both. In some embodiments, the date tree trunks and date tree leaves and leaf stems may be obtained from the species *Phoenix dactylifera*. It should be appreciated that, in some embodiments, the date tree trunks, date tree leaves and leaf stems, and date tree panicles may be obtained from genetically modified date trees (that is, genetically modified organisms (GMOs)). In some embodiments, the date tree trunks, date tree leaves and leaf stems, and date tree panicles may be prepared by cleaning the date tree trunks, date tree leaves and leaf stems, and date tree panicles before use or processing, such as by washing the date tree trunks, date tree leaves and leaf stems, and date tree panicles.

In some embodiments, the date tree trunk fibers may include fibers having the following distribution, as determined by the diameters of the fibers passed or retained in mesh openings: about 35% to about 55% of fibers passing through sieve mesh no. 10 and retained in sieve mesh no. 18, about 35% to about 55% of fibers passing through sieve mesh no. 18 and retained in sieve mesh no. 60, and about 5% to about 15% of fibers passing through sieve mesh no. 60 and retained in sieve mesh no. 200. In some embodiments, the date tree trunk fibers have diameters in the range of about 0.4 mm to about 0.8 mm with an average diameter of about 0.6 mm. In some embodiments, date tree leaf and leaf stem fibers may include fibers having the following distribution, as determined by the diameters of the fibers passed or retained in mesh openings: about 55% to about 75% of fibers passing through sieve mesh no. 10 and retained in sieve mesh no. 18, about 15% to about 35% of fibers passing through sieve mesh no. 18 and retained in sieve mesh no. 60, and about 4% to about 16% of fibers passing through sieve mesh no. 60 and retained in sieve mesh no. 200. In some embodiments, the date tree leaf and leaf stem fibers have diameters in the range of about 0.5 mm to about 1 mm with an average diameter of about 0.75 mm. In some embodiments, date tree panicle fibers may include fibers having the following distribution, as determined by the diameters of the fibers passed or retained in the mesh openings: about 55% to about 75% of fibers passing through sieve mesh no. 10 and retained in sieve mesh no. 18, about 15% to about 35% of fibers passing through sieve mesh no. 18 and retained in sieve mesh no. 60, and about 4% to about 16% of fibers passing through sieve mesh no. 60 and retained in sieve mesh no. 200. In some embodiments, the date tree panicle fibers have diameters in the range of about 0.5 mm to about 1 mm with an average diameter of about 0.75 mm.

In some embodiments, the date tree fiber mix LCM is a trinary mix of date tree trunk fibers, date tree leaf and leaf stem fibers, and date tree panicle fibers. In some embodiments, a date tree fiber mix LCM may include 30% by weight date tree trunk fibers, 30% by weight date tree leaf and leaf stem fibers, and 40% by weight date tree panicle fibers. In some embodiments, the date tree fiber mix LCM may include date tree trunk fibers in the range of 20% by weight to 40% by weight, date tree leaf and leaf stem fibers in the range of 20% by weight to 40% by weight, and date tree panicle fibers in the range of 60% by weight to 20% by weight.

In some embodiments, the date tree trunks may include untreated date tree trunks, the date tree leaf and leaf stems may include untreated leaves and leaf stems, and the date tree panicles may include untreated date tree panicles, thus preserving the environmentally-friendly and biodegradable properties of the manufacturing process, the date tree trunk fibers, the date tree leaf and leaf stem fibers, the date tree panicles, and the resulting LCM composition. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the fibers. In such embodiments, the date tree trunk fibers, date tree leaf and leaf stem fibers, and date tree panicles may be manufactured without treating before, during, or after crushing, grinding, drying, or any other processing.

In some embodiments, the date tree fiber mix LCM may be added directly to a drilling fluid, such as a drilling mud, to create an altered drilling fluid having the date tree fiber mix LCM. For example, in some embodiments, the date tree fiber mix LCM may be added to (for example, blended with) an oil-based drilling mud or a water-based drilling mud. In some embodiments, the date tree fiber mix LCM may be added at the mud pit of a mud system. After addition of the date tree fiber mix LCM to a drilling fluid, the altered drilling fluid may be circulated at a pump rate effective to position the altered drilling fluid into contact with a lost circulation zone in a wellbore, such that the date tree fiber mix LCM alters the lost circulation zone (for example, by entering and blocking porous and permeable paths, cracks, and fractures in a formation in the lost circulation zone, such as forming a structure in a mouth or within a fracture). The date tree fiber mix LCM may be particularly suitable for controlling loss of whole mud in porous formations with greater permeability, fractured and vugular formations, and cavernous loss zones.

As noted in the disclosure, the properties of the date tree fiber mix LCM may prevent degradation of the date tree fiber mix LCM while circulating downhole as a fluid loss additive or formation strengthening material. Moreover, the eco-friendly, non-toxic, and environmentally friendly properties of the fibers of the date tree fiber mix LCM may minimize or prevent any environmental impact and effect on ecosystems, habitats, population, crops, and plants at or surrounding the drilling site where the date tree fiber mix LCM is used.

Figure 7:
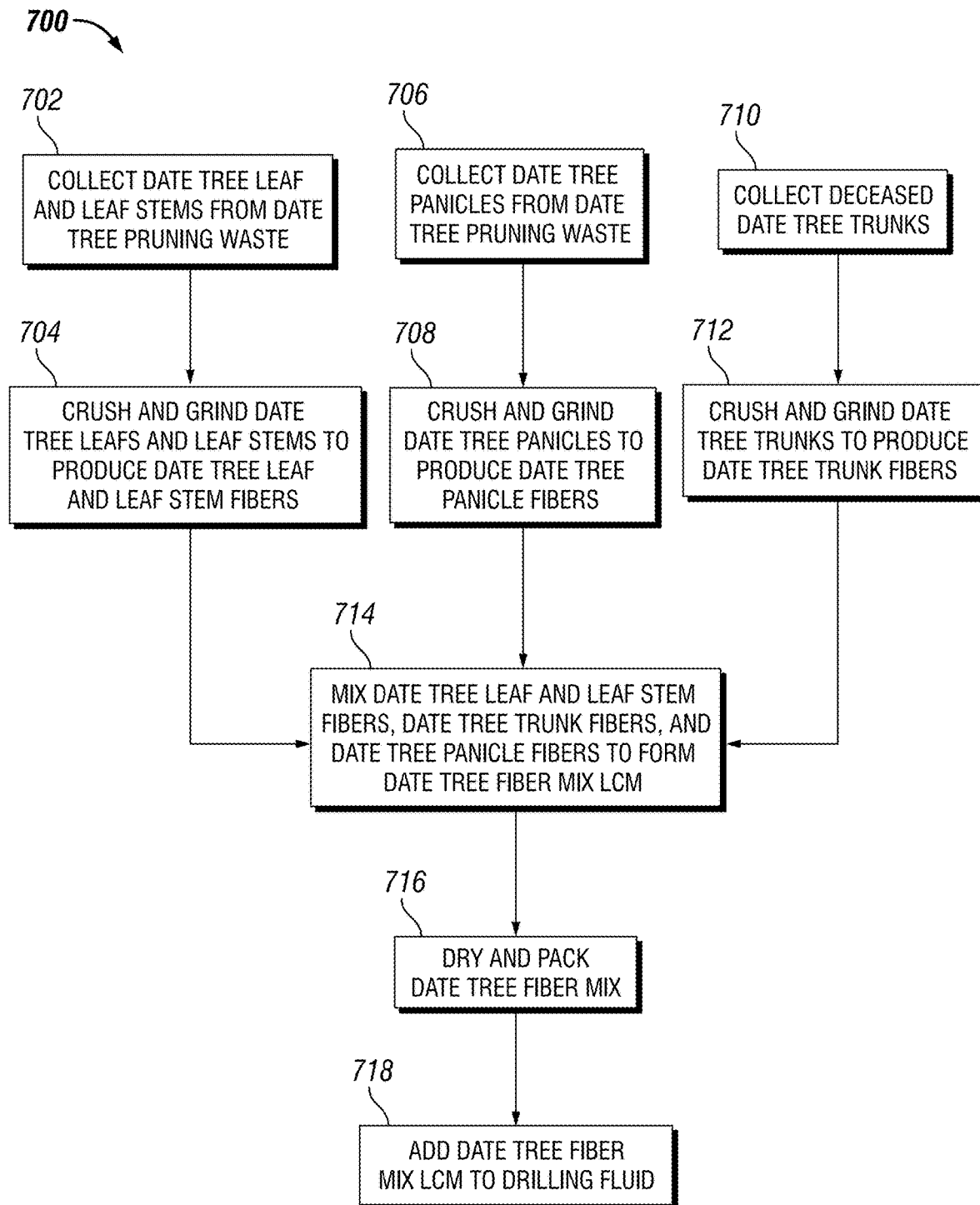
FIG. 7 is a process for the production and use of a date tree fiber mix LCM in accordance with an embodiment of the disclosure.

FIG. 7 depicts a process 700 for the production and use of a date tree fiber mix LCM in accordance with an example embodiment of the disclosure. As shown in FIG. 7, date tree leaves and leaf stems may be collected (block 702), such as from a date tree pruning waste produced by date tree farming and date processing industries. For example, date tree pruning may be performed at regular intervals (for example, yearly), resulting in a regular collection of date tree pruning waste. In some embodiments the date tree leaves and leaf stems may be cleaned, such as by a high pressure water or air jet, to remove dirt, dust, and other foreign substances. The collected date tree leaves and leaf stems may be crushed and ground to produce fibers from the date tree leaves and leaf stems (block 704). In some embodiments, the collected date tree leaves and leaf stems may be crushed and ground using a suitable commercial grinder that produces a specific range of fiber sizes (for example, length and diameter). Similarly, date tree panicles may be collected (block 706), such as from a date tree pruning waste produced by date tree farming and date processing industries. In some embodiments, the date tree panicles may be cleaned, such as by a high pressure water or air jet, to remove dirt, dust, and other foreign substances. The date tree panicles may be crushed and ground to produce fibers from the date tree panicles (block 708), such as by using a suitable commercial grinder that produces a specific range of fiber sizes (for example, length and diameter).

As also shown in FIG. 7, deceased date tree trunks may be collected, such as from date tree waste produced at a date processing facility (block 710). In some embodiments, date tree waste may be collected from a date processing facility and transported to another facility for processing as described in the disclosure. In some embodiments the date tree trunks may be cleaned, such as by a high pressure water or air jet, to remove dirt, dust, and other foreign substances. The collected date tree trunks may be crushed and ground to produce fibers from the date tree trunks (block 712). In some embodiments, the collected date tree trunks may be crushed and ground using a suitable commercial grinder that produces a specific range of fiber sizes (for example, length and diameter).

The date tree leaf and leaf stem fibers, the date tree trunk fibers, and date tree panicle fibers may then be mixed in specific proportions to form a date tree fiber mix LCM having all three types of fibers (block 714). In some embodiments, the amounts of each type of fiber may be weighed to determine the specific proportions used to form the date tree fiber mix LCM. For example, in some embodiments, the amounts of each type of fiber may be weighed to determine the specific amounts to form a date tree fiber mix LCM. In some embodiments, for example, the date tree fiber mix LCM may be formed from 30% by weight date tree trunk fibers, 30% by weight date tree leaf and leaf stem fibers, and 40% by weight date tree panicle fibers.

In some embodiments, the trinary mix of date tree leaf and leaf stem fibers, date tree panicle fibers, and date tree trunk fibers may be dried and packed for transportation and use (block 716). For example, the date tree leaf and leaf stem fibers, date tree panicle fibers, and the date tree trunk fibers may be packed in water-proof bags containing about 25 kilograms (kg) of the mixed fibers. In some embodiments, the date tree leaf and leaf stem fibers, date tree panicle fibers, and the date tree trunk fibers may be dried using a sun drying process over a time period in atmospheric conditions. In some embodiments, a suitable amount of packed mixed fibers may then be transported to an oil and gas operations site for use as a date tree fiber mix LCM.

In some embodiments, the date tree fiber mix LCM may be added directly to a drilling fluid (block 718), such as a drilling mud, to create an altered drilling fluid having the date tree fiber mix LCM. For example, in some embodiments, the date tree fiber mix LCM may be added to (for example, blended with) an oil-based drilling mud or a water-based drilling mud. In some embodiments, the date tree fiber mix LCM may be added at the mud pit of a mud system. After addition of the date tree fiber mix LCM to a drilling fluid, the altered drilling fluid may be circulated at a pump rate effective to position the drilling fluid into contact with a lost circulation zone in a wellbore, such that the date tree fiber mix LCM alters the lost circulation zone (for example, by entering and blocking porous and permeable paths, cracks, and fractures in a formation in the lost circulation zone). As previously stated, the date tree fiber mix LCM may form a fiber network at openings of paths, cracks, and fractures in a loss zone. In some embodiments, the reduced rate of lost circulation may be negligible. In some embodiments, the date tree fiber mix LCM may be introduced via an open ended drill pipe to place the LCM in the lost circulation zone In other embodiments, the date tree fiber mix LCM and one or more additional LCMs may be added to a drilling fluid, such as a drilling mud, to create an altered drilling fluid having the LCMs. For example, in some embodiments, the date tree fiber mix LCM and one or more additional LCMs may be added to an oil-based drilling mud or a water-based drilling mud. In other embodiments, the date tree fiber mix LCM may be added to a cement slurry for use in a cementing operation.

The biodegradation properties of the date tree leaf and leaf stem fibers, the date tree panicle fibers, and the date tree trunk fibers of the date tree fiber mix LCM may enable the date tree fiber mix LCM to easily degrade and disappear from the environment over time and minimize or prevent any environmental impact. Further, the non-toxic properties of the date tree fibers may minimize or prevent any effect on ecosystems, habitats, population, crops, and plants surrounding the drilling site where the date tree fiber mix LCM is used.

In some embodiments, the date tree fiber mix LCM may be mixed with a carrier fluid, a viscosifier, or both. In some embodiments, a date tree fiber mix LCM homogenous suspension or pill may be formed. For example, a specific carrier fluid, viscosifier, or combination thereof may be selected to form a homogenous suspension or pill having the date tree fiber mix LCM. The homogenous suspension or pill may be added to a drilling fluid and used in the manner similar to the date tree fiber mix LCM described in the disclosure.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. An altered drilling fluid, comprising:
   a drilling fluid; and
   a lost circulation material (LCM), wherein the LCM comprises:
   a first plurality of fibers produced from date tree trunks, wherein each of the first plurality of fibers produced from date tree trunks has a diameter in the range of 0.4 millimeters (mm) to about 0.8 mm; and
   a second plurality of fibers produced from at least one of date tree leaves and date tree leaf stems, wherein each of the second plurality of fibers produced from at least one of date tree leaves and date tree leaf stems has a diameter in the range of 0.5 millimeters (mm) to about 1 mm; and
   a third plurality of fibers produced from date tree panicles, wherein each of the third plurality of fibers produced from date tree panicles has a diameter in the range of about 0.5 mm to about 1 mm,
   wherein the first plurality of fibers comprise 30% by weight of the LCM, the second plurality of fibers comprise 30% by weight of the LCM, and the third plurality of fibers comprise 40% by weight of the LCM.

2. The altered drilling fluid of claim 1, wherein the LCM consists of the first plurality of fibers produced from date tree trunks, the second plurality of fibers produced from at least one of date tree leaves and date tree leaf stems, and the third plurality of fibers produced from date tree panicles.

3. The altered drilling fluid of claim 1, wherein the LCM comprises a concentration of at least 30 pounds-per-barrel (ppb) in the altered drilling fluid.

4. The altered drilling fluid of claim 1, wherein the first plurality of fibers comprise a first plurality of untreated fibers, the second plurality of fibers comprise a second plurality of untreated fibers, and the third plurality of fibers comprise a third plurality of untreated fibers.

* * * * *